United States Patent [19]

Fridman

[11] Patent Number: 5,443,313
[45] Date of Patent: Aug. 22, 1995

[54] METHOD FOR PRODUCING CONSTRUCTION MIXTURE FOR CONCRETE

[76] Inventor: Vladlen Fridman, 738 Oceanview Ave., #1D, Brooklyn, N.Y. 11235

[21] Appl. No.: 323,663

[22] Filed: Oct. 17, 1994

[51] Int. Cl.⁶ ............................................. B28C 1/16
[52] U.S. Cl. .................................... 366/2; 366/64; 366/601
[58] Field of Search ................ 366/2, 4, 6, 7, 17, 366/22, 23, 24, 64, 65, 66, 279, 206, 601

[56] References Cited

U.S. PATENT DOCUMENTS

| | | | |
|---|---|---|---|
| 3,797,610 | 3/1974 | Windle | 366/2 |
| 4,091,462 | 5/1978 | Igarashi et al. | 366/64 |
| 4,838,699 | 6/1989 | Jour et al. | 366/2 |

FOREIGN PATENT DOCUMENTS

| | | |
|---|---|---|
| 3927252 | 2/1991 | Germany . |
| 2017701 | 8/1994 | Russian Federation . |
| 1668344 | 8/1991 | U.S.S.R. . |

OTHER PUBLICATIONS

"Technology of Concrete and Reinforced Concrete Products" Moscow, Stroyizdat, 1971, pp. 152–154, 170–172.

Primary Examiner—David A. Scherbel
Assistant Examiner—Tony G. Soohoo
Attorney, Agent, or Firm—I. Zborovsky

[57] ABSTRACT

A method of producing activated construction mixture composed of cement, sand, water and additive introduced at an end of mixing, the method includes the steps of mixing components in a mixer with a specific consumed power of 30–600 watt/kg of mixture, using for the mixing an impeller, determining a consumed power and energy spent for mixing and establishing it within 5.0–400.0 kilo joule/kg of mixture, introducing an admixture after increase in a temperature of the mixture to 40°–75° C.

6 Claims, No Drawings

METHOD FOR PRODUCING CONSTRUCTION MIXTURE FOR CONCRETE

BACKGROUND OF THE INVENTION

The present invention relates to methods of producing activated construction mixtures including of mixing of components such as cement, water, sand and additives, in particular in a rotor mixers-activators.

It is known to activate a cement solution in a high speed mixer of turbulent and turbulent-whirl type which makes possible obtaining of a mixture with high uniformity so that it does not form separate layers during transportation. This method is disclosed for example in the publication of Gershberg O. A. "Technology of Concrete and Reinforced Concrete Products", Moscow, Stroyizdat, 1971, pages 152-154. However, inorderly whirling movements of particles do not create here conditions for the most economical use of energy for the purpose of activation.

It is further known to activate construction mixture with evaluation of the degree of activation by evaluating the change of flowability of mixture with the use of special additive for liquefication of the activated mixture. This method is disclosed for example in the Russian Inventor Certificate Number 1668344 of Fridman, V. V., et al. "Method of Producing Activated Binder". This method is not sufficiently efficient during its use for mixture which have low initial flowability or does not flow at all, which often are used in construction. The realization of this method for mixtures with different ratios of its components, cement, sand and water shows that many mixtures remain underactivated and make segregations during subsequent liquefication with the use of a recommended additive.

A method of producing activated mixture with the evaluation of the degree of activation from increase in mixture temperature due to dissipation of energy and introduction of superplasticizer at increased temperature of mixture by 25°-40° is disclosed in Russian Patent Number 2,017,701 of Fridman, V. V. et al., "Method of V. V. Fridman for Obtaining Activated Construction Mixture". This method also does not provide objective evaluation of degree of activation of mixture for the following reasons. There are difficulties in measurements of the temperature of the mixture in conditions when highly abrasive particles move high speed. Substantial changes from one batch to another batch of heat losses to the body of the mixer and to environment also makes the temperature control complicated. Faulty evaluation about the degree of activation especially of highly movable mixtures with a filler from non-smooth particles of solid matter is also provided, wherein high heating of these particles takes place with increased circulation of the mixture. Realization of this method does not provide activation with a required reliability and sufficient for preventing a segregation of the mixture after its liquefication to the required flowability.

In addition in the above described methods there are no requirements to the construction and power of rotor mixer-activator for providing optimal conditions to implement the process.

SUMMARY OF THE INVENTION

Accordingly, it is an object of the present invention to provide a method of producing construction mixture for concrete, which avoids the disadvantages of the prior art.

It is also an object of the present invention to provide a method of producing a liquid activated construction mixture which provides a desired degree of activation of the mixture required and sufficient for avoiding its segregation and liquid separation after liquefication to a desired flowability during production of a conventional concrete or setting during production of cellular concrete.

It is also an object of the present invention to provide new method with the above features which can be used for production of mixtures with a ratio of sand to cement from 0.5:1.0 to 3.5:1.0, and also for use of cements with specific surface from 2.5 to 4.5 kvm/g and sands with size module from 1.0 to 3.5 which are usually utilized in the construction industry.

In keeping with these objects and with others which will become apparent hereinafter, one feature of the present invention resides, briefly stated, in a method which includes the steps of mixing components in a mixer with a specific consumed power 30-600 watt per 1 kg of mixture by an impeller with vanes located in a plane of its rotary axis, determining a consumed power and energy spent for mixture which must be from 5.0 to 400.0 kilo joules (kj) per 1 kg of the mixture; adding of superplasticizer after supplying to the mixture of mechanical energy in a quantity necessary for obtaining the mixture with a desired flowability without segregation and bleeding, or when decrease of the consumed power appears caused by reduction of circulation speed of mixture in the mixer, adding of admixtures of superplasticizer and expander for a cellular concrete with the use of the above mentioned conditions after a temperature increase of the mixture to 35°-75° C.

When the method is performed in accordance with the present invention it avoids the disadvantages of the prior art and provides for highly advantageous results.

The novel features which are considered as characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

In accordance with the present invention a method of obtaining liquid activated construction mixture for conventional and cellular concrete is proposed.

The new method includes the following steps:

mixing components in a mixer with a specific consumed power 30-600 watt per 1 kg of mixture by an impeller with vanes located in a plane of its rotary axis;

determining a consumed power and energy spent for mixture which must be from 5.0 to 400.0 kilo joules per 1 kg of the mixture;

adding of superplasticizer after supplying to the mixture of mechanical energy in a quantity necessary for obtaining the mixture with a desired flowability without segregation and bleeding, or when decrease of the consumed power appears caused by reduction of circulation speed of mixture in the mixer;

adding of admixtures of superplasticizer and expander for a cellular concrete with the use of the above mentioned conditions after a temperature increase of the mixture to 35°-75° C.

The method in accordance with the present invention is based on a thorough investigation by the inventor of the nature of phenomena which takes place during production of activated construction mixture. It has been found that during mixing of cement, sand and water in the mixer-activator with the inventive energy and having an impeller with vanes located in the plane of its rotary axis, in addition to deflocculation of aggregated cement grains, surface abrasion of solid particles and destruction of soft impurities, the main part of the energy is spent for activation of a surface of a solid phase which leads to its adsorption of polarized water molecules. The degree of adsorption increases with increase of quantity of spent energy. Therefore parameters which characterize absorption of mechanical energy by the mixture are selected as main parameters which can control the process of activation of mixture while the control based on the changes of flowability and heating of the mixture which is utilized in the cited Inventor's Certificate and patent are used auxiliary since they always accompany the activation but frequently are not directly dependent from the degree of adsorption of water by the liquid phase.

The introduction of admixture (additive) of the superplasticizer into the activated mixture for obtaining the desired flowability of the final mixture can provoke weakening of the bonds of water with solid phase if the spent energy of activation is not sufficient. In other words, the mixture must be activated just sufficiently for providing its sedimentation stability at the given flowability.

When the method is used for producing of cellular concrete, in addition to the superplasticizer, an expanding admixture is introduced. Its action is based on gas production during cooperation with alkali of the cement paste. It is known that these reactions are performed well at a temperature of mixture not lower than 35° C. in a known traditional technology this temperature is obtained by a preliminary heating of components and exothermal conditions of the reaction. For this purpose after the introduction of the admixture, the mixture is additionally mixed during 2 minutes as disclosed for example in the above cited publication on pages 170-172. In accordance with the new proposed method, the heating of the mixture to 35°-75° C. is performed due to the activation, and after this, both the superplasticizer admixture and the expanding admixture are introduced. The mixture is liquefied during several seconds. During this time the expanding admixture has enough time to uniformly distribute through the whole volume of the mixture. Then the finished mixture is poured into a mold and then expanded. For each variant of the mixture, optimal expenses of energy are determined which provide the stability of the final mixture after liquefication and expansion.

When compared with the known traditional technologies of obtained a cellular concrete the method of the present invention does not require a preliminary size reduction of sand and additional introduction of alkali components since the sedimentation stability of the mixture is obtained without its precipitation with the use of natural sand. In addition, the activated mixture has a sufficient quantity of calcium hydroxide for providing active gassing and swelling of mixture without addition of alkali admixtures.

With respect to the specific consumed power of the mixture 30-600 watt/kg of mixture in accordance with the present invention, it has been experimentally determined that when the specific power is less than 40 watt/kg than even at low values of water-cement ratio the process of activation is so slow that it does not correspond to conventional technological cycles of mixture production. On the other hand, the mixer having a specific power more than 600 watt/kg cannot be used since it is difficult to justify their economical efficiency. This specific power of conventional concrete mixers is usually about 10 watt/kg.

As for the quantity of energy spent for mixing 5.0 to 400.0 kilo joule per 1 kg mixture, the lower level is obtained during mixing in the mixer with specific power of 30 watt/kg of mixture with the component ratio of cement-sand-water equal to 1.0—0.5—0.3. The upper limit is obtained during mixing of the mixture with the component ratio of cement-sand-water equals 1.0—3.0—0.7 in a mixer with a specific consumed power 600 watt/kg.

Finally, the heating of the mixture to temperature in the interval 35°-75° C. before the introduction of admixtures of superplasticizer and an expanding substance is provided as follows: At the temperatures of less than 35° C., the kinetics of gassing is reduced and the density of cellular concrete is substantially increased. When the heating is performed above 75° C. there is a danger of setting of mixture in the mixer. The optimal temperature is selected within the above mentioned interval depending on the ambient temperature. The lower the ambient temperature the higher is the temperature of mixture during introduction of admixtures.

The method according to the present invention is explained by the following examples:

EXAMPLE I

A mixture is produced for small castings. A mixer with an output 4 l (1 gal) has a specific power of 440 watt/kg (200 W/lb), an average spent power 1,500 watt, energy expenses for mixing 130 kilo joule/kg (59 kilo joule/lb), a mixture composition cement-water-sand-superplasticizer equal to 1.0—0.49—2.0—0.01 mass parts, the flowability of mixture in accordance with Suttard viscosimeter is 170 mm (6.7 in), and the strength of concrete 50 MPA (7250 psi).

EXAMPLE II

A mixture for cast roof tiles is produced in a mixer with an output of 90 l (23 gal) with a specific power of the mixer 134 watt/kg (61 W/lb), average spent power 25 kwatt, energy expenditures for mixing 64 kilo joule/kg (29 kilo joule/lb), a mixture content is cement-water-sand-superplasticizer mass parts equal 1.0—0.48—3.0—0.012, the flowability of mixture in accordance with Suttard viscosimeter is 150 mm (6 in), the strength of concrete 35 MPA (5075 psi).

EXAMPLE III

An activated solution part for conventional concrete is produced in a mixer with a mixture output of 320 l (85 gal) a specific power 67 watt/kg (30.4 W/lb), an average consumed power 40 kwatt, energy consumption for mixing 8 kilo joule/kg (3.6 kilo joule/lb), a mixture composition cement-water-sand-superplasticizer in mass parts 1.0—0.32—0.5—0.005, the flowability in accordance with Suttard viscosimeter 180 mm (7 in), concrete strength with activated solution part 36.0 MPA (5220 psi).

EXAMPLE IV

A mixture for cellular concrete is produced in a mixer with a mixture output 100 l (26.4 gal), a specific power 200 watt/kg (91 W/lb), an average consumed power 45 kwatt, energy expenditures for mixing 73 kg joules kg (33.1 kilo joule/lb), a mixture composition cement-water-sand-superplasticizer-expanding admixture equals 1.0—0.48—2.0—0.006—0.0020 in mass parts, the flowability in accordance with the Suttard viscosimeter 160 mm (6.3 in), the coefficient of expansion 1.7, the density of cellular concrete 900–1,000 kg/m$^3$ (60 psf), concrete strength 2.0–3.0 MPA (290–430 psi).

It will be understood that each of the elements described above, or two or more together, may also find a useful application in other types of methods differing from the types described above.

While the invention has been illustrated and described as embodied in a method of producing construction mixture for concrete, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method of producing activated construction mixture composed of cement, sand, water and additive introduced at an end of mixing, the method comprising the steps of mixing components in a mixer with a specific consumed power of 30–600 watt/kg of mixture; using for the mixing an impeller; determining a consumed power and energy spent for mixing and establishing it within 5.0–400.0 kilo joule/kg of mixture; introducing an admixture.

2. A method as defined in claim 1, wherein said introducing of admixture includes introducing of a superplasticizer.

3. A method as defined in claim 1, wherein said introducing of admixture includes introducing of an expanding admixture.

4. A method as defined in claim 1, wherein said introducing of admixture includes introducing of a superplasticizing admixture and an expanding admixture after increase in a temperature of the mixture to 40°–75° C.

5. A method as defined in claim 1, wherein said introducing is performed after supplying to the mixture of mechanical energy sufficient for obtaining a mixture with desired flowability without segregation and bleeding.

6. A method as defined in claim 1, wherein said introducing includes introducing of the admixture when a decrease of the consumed power caused by reduction of a speed of circulation of the mixture is determined.

* * * * *